United States Patent
Kim et al.

(10) Patent No.: US 11,383,291 B2
(45) Date of Patent: Jul. 12, 2022

(54) HOLLOW DRIVE SHAFT USING UPSETTING METHOD AND MANUFACTURING METHOD THEREFOR

(71) Applicant: ILJIN STEEL CORPORATION, Jeollabuk-do (KR)

(72) Inventors: Sung Ha Kim, Gyeonggi-do (KR); Eui Hyouk Hwang, Gyeonggi-do (KR); Young June Park, Gyeonggi-do (KR)

(73) Assignee: ILJIN STEEL CORPORATION, Jeollabuk-do (KR)

( * ) Notice: Subject to any disclaimer, the term of this patent is extended or adjusted under 35 U.S.C. 154(b) by 0 days.

(21) Appl. No.: 16/972,712

(22) PCT Filed: Nov. 29, 2018

(86) PCT No.: PCT/KR2018/014949
§ 371 (c)(1),
(2) Date: Dec. 7, 2020

(87) PCT Pub. No.: WO2020/067605
PCT Pub. Date: Apr. 2, 2020

(65) Prior Publication Data
US 2021/0252584 A1 Aug. 19, 2021

(30) Foreign Application Priority Data
Sep. 28, 2018 (KR) ........................ 10-2018-0115942

(51) Int. Cl.
*B21J 5/08* (2006.01)
*B21J 5/12* (2006.01)
(Continued)

(52) U.S. Cl.
CPC . *B21J 5/08* (2013.01); *B21J 1/06* (2013.01); *B21J 5/12* (2013.01); *B21K 1/063* (2013.01); *B23B 5/08* (2013.01)

(58) Field of Classification Search
CPC ......... B21J 1/06; B21J 5/08; B21J 9/06; B21J 9/08; B21K 1/063; B21K 1/066
See application file for complete search history.

(56) References Cited

U.S. PATENT DOCUMENTS 1,010,004 A * 11/1911 Wales ..................... B21C 37/16
301/124.1
2,065,595 A * 12/1936 Lynch .................... B21K 21/08
29/523
(Continued)

FOREIGN PATENT DOCUMENTS

JP S60118348 A 6/1985
JP 2007-075824 A 3/2007
(Continued)

OTHER PUBLICATIONS

Office Action from corresponding Korean Patent Application No. 10-2018-0115942, dated Sep. 21, 2019.
(Continued)

*Primary Examiner* — Edward T Tolan
(74) *Attorney, Agent, or Firm* — Harness, Dickey & Pierce, P.L.C.

(57) ABSTRACT

Provided are a hollow drive shaft using an upsetting method and a method of manufacturing the same, in which hot forging and upsetting processes are applied to both ends of a workpiece so that an outer diameter at both ends of the workpiece is greater than an outer diameter of a middle part of the workpiece, thereby reducing a weight of the drive shaft and enabling the drive shaft to transmit higher driving power. According to the present invention, the upsetting process is applied during the hot forging process to manufacture the hollow drive shaft, portions to be substantially processed are limited to portions at both ends of the workpiece, and the number of upsetting processes is limited to a (Continued)

minimum number (2 or the like), such that initial investment costs and manufacturing costs are low because the number of processes is small.

5 Claims, 11 Drawing Sheets

(51) Int. Cl.
  *B21J 1/06* (2006.01)
  *B21K 1/06* (2006.01)
  *B23B 5/08* (2006.01)

(56) References Cited

U.S. PATENT DOCUMENTS

| | | | | |
|---|---|---|---|---|
| 2,258,242 | A * | 10/1941 | Ditzel | B21C 1/24 72/276 |
| 3,588,933 | A * | 6/1971 | Shinopulos et al. | B21K 1/52 470/191 |
| 4,470,286 | A * | 9/1984 | Asari | B21K 21/12 72/356 |
| 4,845,972 | A * | 7/1989 | Takeuchi | B21K 21/12 72/370.03 |
| 5,184,495 | A * | 2/1993 | Chunn | B21K 1/063 72/359 |
| 5,379,625 | A * | 1/1995 | Hale | B21J 5/08 72/370.03 |
| 5,517,843 | A * | 5/1996 | Winship | B21K 21/12 72/356 |
| 5,956,988 | A * | 9/1999 | Beste | F16L 13/14 72/367.1 |
| 7,275,407 | B2 * | 10/2007 | Ginsberg | B21C 37/16 72/370.03 |
| 10,486,487 | B2 * | 11/2019 | Nagano | B21J 5/08 |
| 2016/0305469 | A1 | 10/2016 | Kim et al. | |
| 2017/0241472 | A1 * | 8/2017 | Walser | B62D 1/16 |
| 2019/0076902 | A1 * | 3/2019 | Mizumura | B21C 37/18 |

FOREIGN PATENT DOCUMENTS

| | | |
|---|---|---|
| KR | 10-0776247 B1 | 11/2007 |
| KR | 10-2008-0050342 A | 6/2008 |
| KR | 10-2010-0027258 A | 3/2010 |
| KR | 10-1199767 B1 | 11/2012 |
| KR | 10-2015-0059668 A | 6/2015 |
| KR | 10-1664682 B1 | 10/2016 |
| KR | 10-1901054 B1 | 9/2018 |

OTHER PUBLICATIONS

Office Action from corresponding Korean Patent Application No. 10-2018-0115942, dated Mar. 19, 2020.

International Search Report from corresponding PCT Application No. PCT/KR2018/014949, dated Jun. 27, 2019.

* cited by examiner

HOLLOW DRIVE SHAFT USING UPSETTING METHOD AND MANUFACTURING METHOD THEREFOR

CROSS-REFERENCE TO RELATED APPLICATIONS

The present application is a National Stage of International Application No. PCT/KR2018/014949 filed on Nov. 29, 2018, which claims the benefit of Korean Patent Application No. 10-2018-0115942, filed on Sep. 28, 2018 with the Korean Intellectual Property Office, the entire contents of each hereby incorporated by reference.

FIELD

The present invention relates to a method of manufacturing a hollow drive shaft for a vehicle, and more particularly, to a hollow drive shaft using an upsetting method and a method of manufacturing the same, in which hot forging and upsetting processes are applied to both ends of a workpiece so that an outer diameter at both ends of the workpiece is greater than an outer diameter of a middle part of the workpiece, thereby reducing a weight of the drive shaft and enabling the drive shaft to transmit higher driving power.

BACKGROUND

In general, a drive shaft is installed in a vehicle in order to transmit power to two left and right wheels of the vehicle from a transaxle driven by power from a transmission that performs a gear shifting operation on power of an engine.

Because a solid drive shaft causes an increase in weight of a vehicle body as well as high noise, there is a disadvantage in that a separate damper needs to be mounted on the drive shaft.

Vehicle manufacturers have consistently replaced the solid drive shafts with hollow drive shafts in order to reduce weights of the vehicles and reduce noise.

The hollow drive shaft decreases in weight by 30 to 40% and increases in rigidity by about 30% in comparison with the solid drive shaft, such that it is possible to solve a problem with resonance.

Types of hollow drive shafts for a vehicle in the related art include a 3-pieces welded type in which stub shafts are joined, by friction welding, to two left and right sides of a hollow shaft having a hollow portion at a center thereof, and a 1-piece swaged type in which one pipe workpiece is integrally manufactured by a swaging process.

The hollow drive shaft manufactured by the friction method causes a problem of an increase in manufacturing costs because a total of three sub-components including one pipe and two stub shafts are required to manufacture one component, the stub shafts need to be coupled, by friction welding, to both ends of the pipe, and then a bead cutting process and an additional polishing process need to be additionally performed on an outer surface of the hollow drive shaft.

In addition, the friction welding cannot obtain a uniform metal flow, and it is difficult to satisfy durability required for the drive shaft due to welded portions.

The hollow drive shaft, which is manufactured by the swaging process, is provided to solve the above-mentioned problems, but has a problem in that initial investment costs are high and manufacturing cost are increased because the swaging process including maximum eight steps needs to be performed.

Because the swaging process is performed in a cold state, there is a high risk in that cracks are formed inside and outside the workpiece while the workpiece undergoes rapid plastic processing, and as a result, there is a problem in that a defect rate is remarkably increased or durability is rapidly decreased.

In addition, because the swaging process is a cold forging process, there is a drawback in that noise is very severely generated, which causes a deterioration in working environment.

Recently, the hollow drive shaft has an increased outer diameter at both ends thereof, and thus a constant velocity joint and a ball cage, which are fastened to both ends of the hollow drive shaft, have increased diameters, such that it is possible to increase the number of balls and thus to transmit higher driving power.

However, because the swaging process cannot separately increase the outer diameters at both ends of the hollow drive shaft, there is a problem in that it is impossible to manufacture a structure of the hollow drive shaft, only the outer diameters at both ends of which may be increased.

SUMMARY

The present invention has been made in an effort to solve the above-mentioned problems, an object of the present invention is to provide a hollow drive shaft using an upsetting method and a method of manufacturing the same, in which hot forging and upsetting processes are applied to both ends of a workpiece so that an outer diameter at both ends of the workpiece is greater than an outer diameter of a middle part of the workpiece, thereby reducing a weight of the drive shaft and enabling the drive shaft to transmit higher driving power.

In order to achieve the above-mentioned object, a method of manufacturing a hollow drive shaft using an upsetting method according to the present invention includes: inserting both ends of a workpiece cut to a predetermined length into a heating unit and heating both ends of the workpiece to a predetermined temperature; and inserting both ends of the heated workpiece into a forming die and then pressing both ends of the heated workpiece with a mandrel in order to perform an upsetting process so that an outer diameter at both ends of the workpiece is greater than an outer diameter of a middle part of the workpiece, and further includes: performing, after completing the performing of the upsetting process, a CNC machining process of performing turning machining on both ends of the workpiece, which has been subjected to the upsetting process, to a predetermined dimension and shape by using a computer numerical control (CNC) lathe; performing, by using a form rolling machine, a rolling process to form splines at both ends of the workpiece that has been subjected to the CNC machining process; performing a high-frequency heat treatment process of heating, by using a high-frequency heat treatment device, the workpiece, which has been subjected to the rolling process, to a predetermined temperature, cooling and quenching the workpiece, heating again, by using the high-frequency heat treatment device, the quenched workpiece to a predetermined temperature, and then cooling and tempering the workpiece; performing, after performing the high-frequency heat treatment process, a correction process of correcting a changed dimension by using a press; and performing a painting process of forming a paint film in order to ensure an aesthetic appearance and corrosion resistance.

A hollow drive shaft for a vehicle using an upsetting method according to the present invention includes: a middle part which is a middle portion of the drive shaft and has a hollow portion formed therein; and both ends of the drive shaft each having therein a hollow portion that communicates with the middle part, and having, by applying an upsetting process, a greater outer diameter and a larger thickness than the middle part.

A hollow drive shaft for a vehicle using an upsetting method according to the present invention includes: a middle part which is a middle portion of the drive shaft and has a hollow portion formed therein; and both ends of the drive shaft each having therein a hollow portion that communicates with the middle part, and having, by applying an upsetting process, a greater outer diameter and a larger thickness than the middle part, and a smaller inner diameter than the middle part.

A hollow drive shaft for a vehicle using an upsetting method according to the present invention includes: a middle part which is a middle portion of the drive shaft and has a hollow portion formed therein; and both ends of the drive shaft each having therein a hollow portion that communicates with the middle part, and having, by applying an upsetting process, a smaller inner diameter than the middle part, and an equal outer diameter to the middle part.

With the above-mentioned configuration of the present invention, the upsetting process is applied during the hot forging process to manufacture the hollow drive shaft, the portions to be substantially process are limited to portions at both ends of the workpiece, and the number of upsetting processes is limited to a minimum number (2 or the like), such that initial investment costs and manufacturing costs may be low because the number of processes is small.

According to the present invention, the hollow drive shaft is manufactured by the upsetting process instead of the swaging process, such that manufacturing costs may be reduced and performance of the drive shaft may be improved.

According to the present invention, the hollow drive shaft may have the increased outer diameter at both ends thereof, which cannot be implemented by the swaging process, and thus a constant velocity joint and a ball cage, which are fastened to both ends of the drive shaft, may have increased diameters, such that it is possible to increase the number of balls and thus to transmit higher driving power.

DETAILED DESCRIPTION

Throughout the specification, unless explicitly described to the contrary, the word "comprise/include" and variations such as "comprises/includes" or "comprising/including" will be understood to imply the inclusion of stated elements, not the exclusion of any other elements.

According to the present invention, an upsetting process is performed during a hot forging process, portions to be substantially processed are limited to portions at both ends of a workpiece, and the number of upsetting processes is limited to a minimum number (2 or the like), such that initial investment costs and manufacturing costs may be low because the number of processes is small.

The present invention provides a method of manufacturing a hollow drive shaft that may have an increased outer diameter at both ends thereof which cannot be implemented by a swaging process in the related art.

Figure 1:
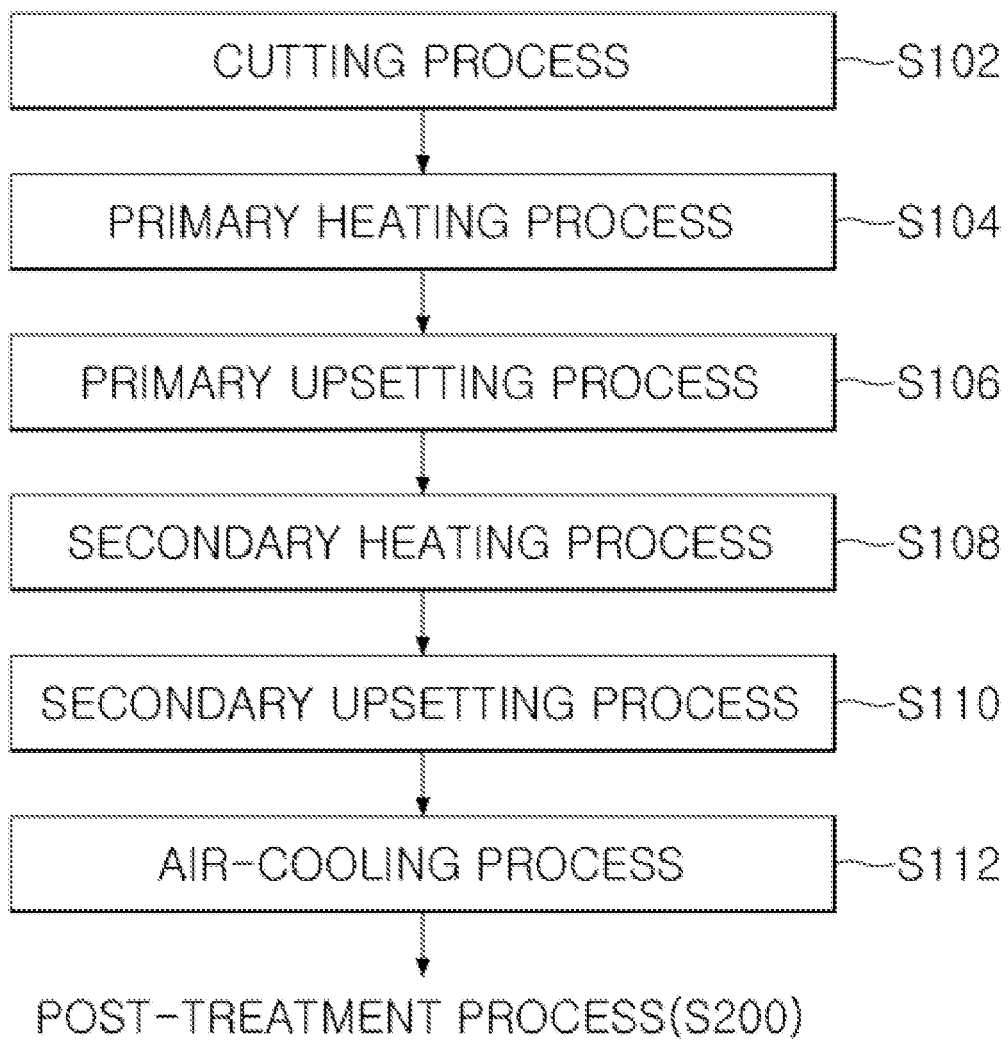
FIGS. 1 and 2 are views illustrating a method of manufacturing a hollow drive shaft according to an exemplary embodiment of the present invention.
Figure 2:
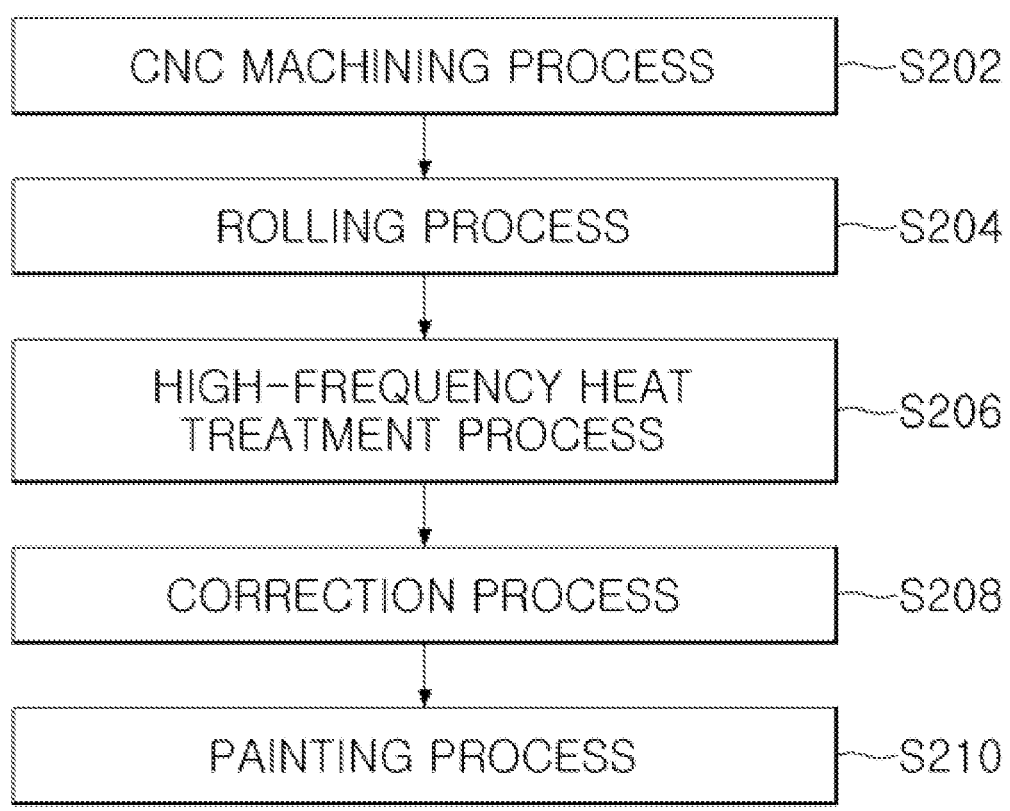

FIGS. 1 and 2 are views illustrating a method of manufacturing a hollow drive shaft according to an exemplary embodiment of the present invention.

Upsetting processing facilities according to an exemplary embodiment of the present invention may be separated for each process or configured in a continuous line.

The upsetting processing facility uses a hot forging process and a press forging forming process which process a workpiece while heating the workpiece to a room temperature or higher in accordance with types or characteristics of the workpieces when the workpiece is inputted.

The method of manufacturing a hollow drive shaft according to the exemplary embodiment of the present invention includes an upsetting process S100 and a post-treatment process S200.

The upsetting process S100 includes a cutting process S102, a primary heating process S104, a primary upsetting process S106, a secondary heating process S108, a secondary upsetting process S110, and an air-cooling process S112. The upsetting process may be performed once, or the upsetting process may be performed twice, three times, four times, or the like in order to obtain a desired thickness at both ends of the workpiece.

Hereinafter, the present invention will be described with reference to an exemplary embodiment in which the upsetting process is performed twice.

Figure 3:
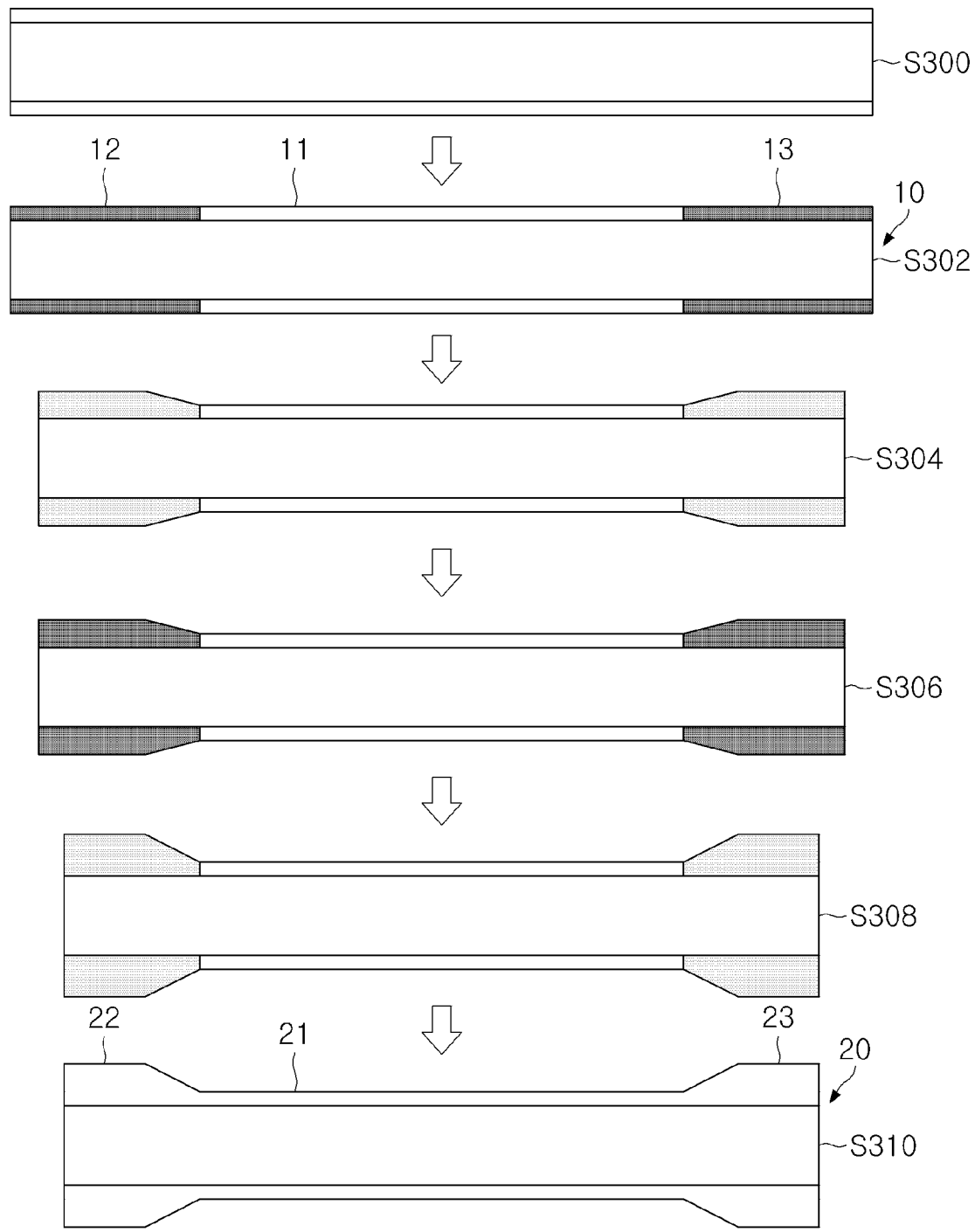
FIG. 3 is a view illustrating states in which shapes of a workpiece are changed by an upsetting process according to the exemplary embodiment of the present invention.
Figure 4:
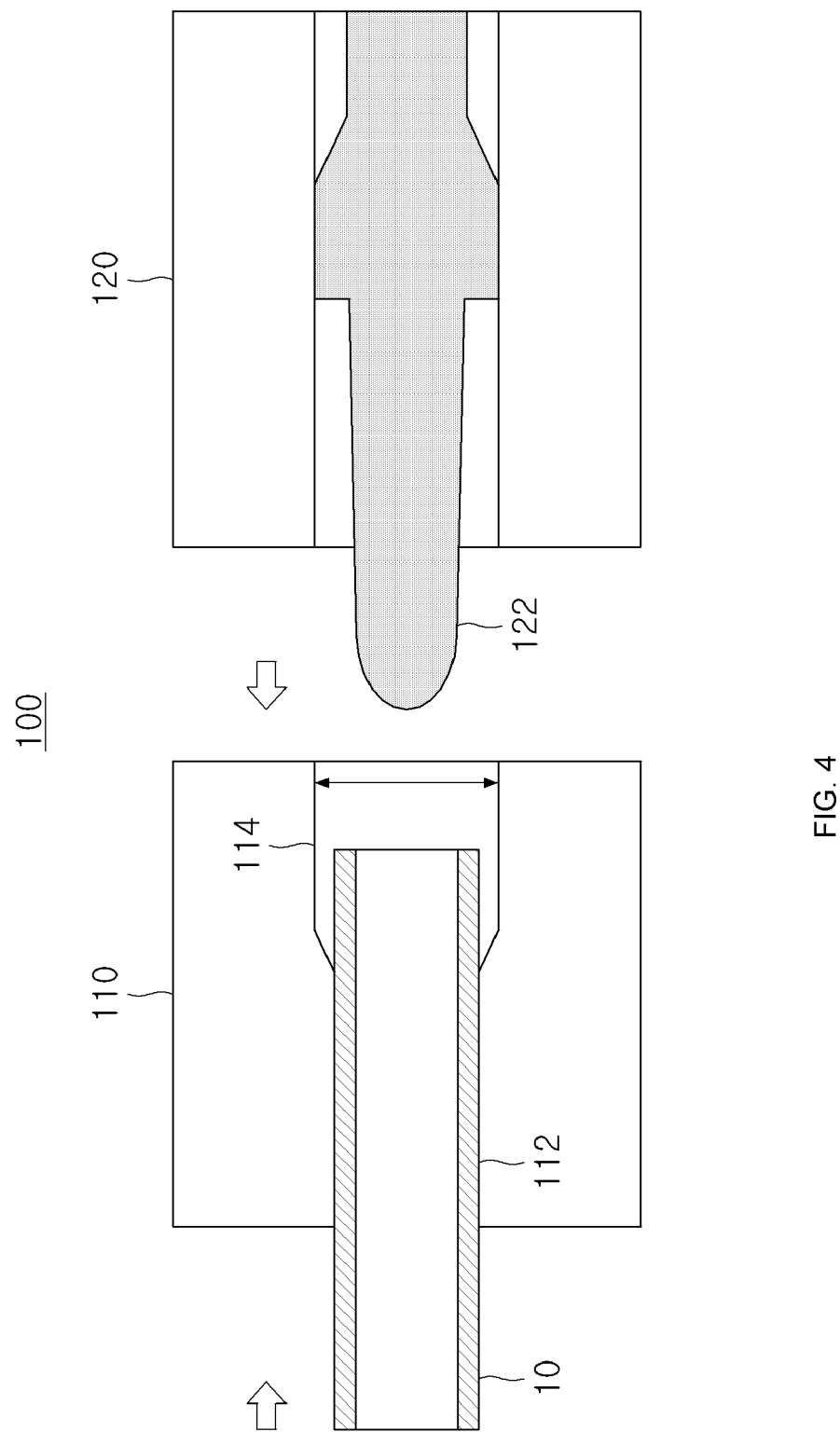
FIG. 4 is a view illustrating a primary upsetting forming process according to the exemplary embodiment of the present invention.
Figure 5:
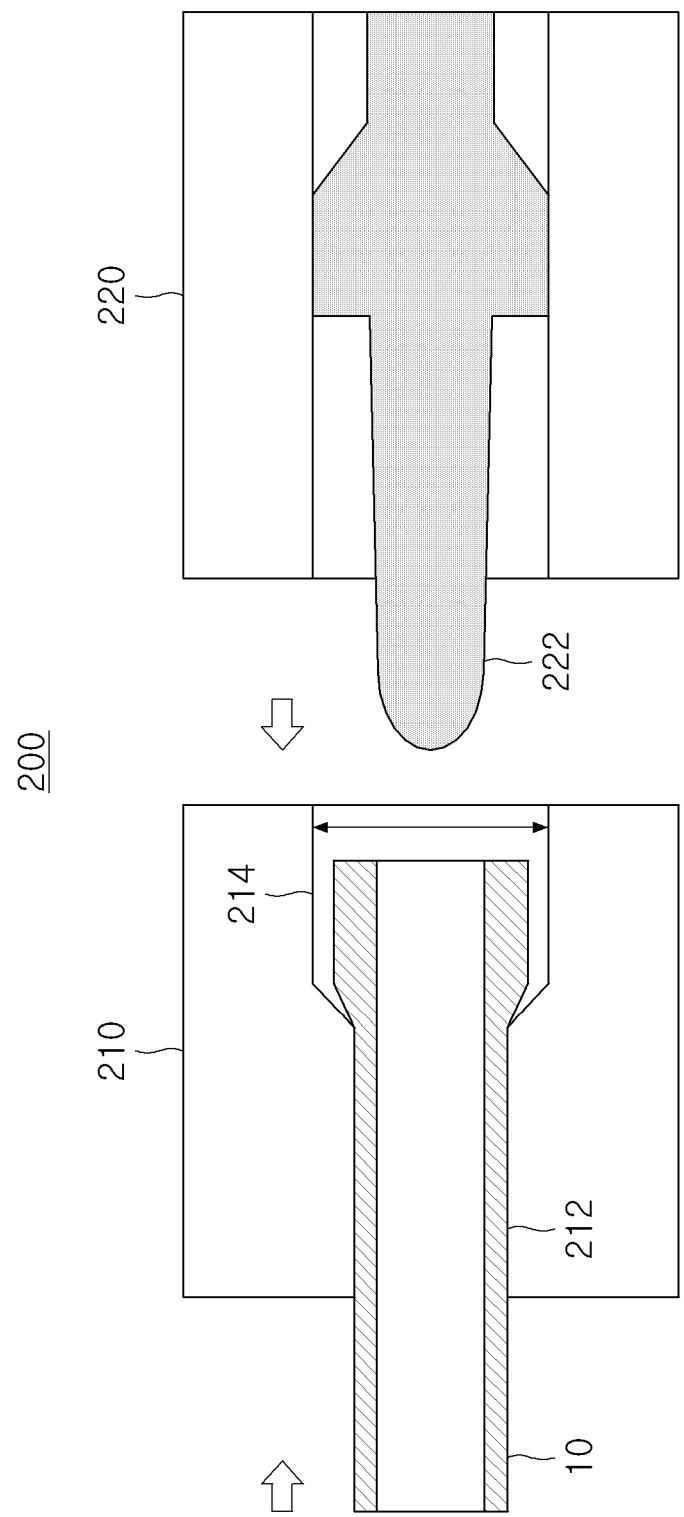
FIG. 5 is a view illustrating a secondary upsetting forming process according to the exemplary embodiment of the present invention.
Figure 6:
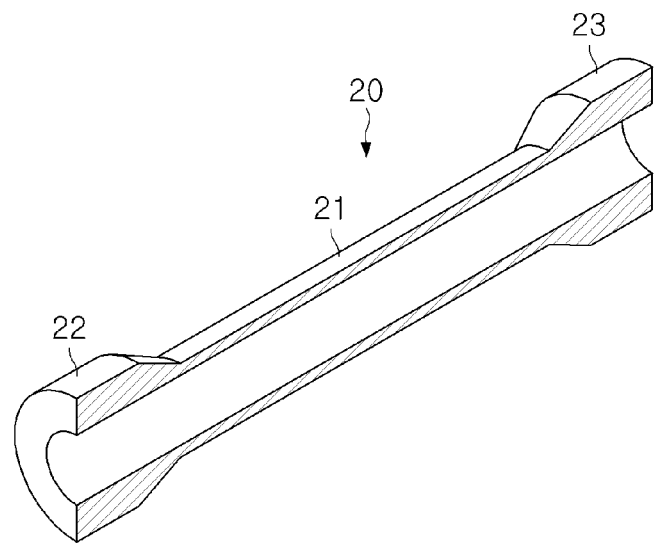
FIGS. 6 and 7 are views illustrating a finished structure of the hollow drive shaft according to the exemplary embodiment of the present invention.
Figure 7:
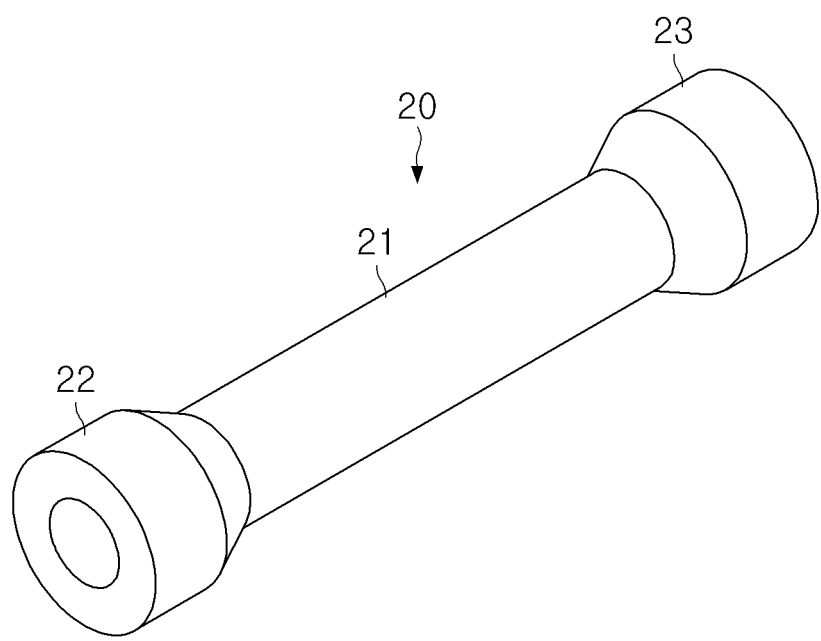

FIG. 3 is a view illustrating states in which shapes of a workpiece are changed by an upsetting process according to the exemplary embodiment of the present invention, FIG. 4 is a view illustrating a primary upsetting forming process according to the exemplary embodiment of the present invention, FIG. 5 is a view illustrating a secondary upsetting forming process according to the exemplary embodiment of the present invention, and FIGS. 6 and 7 are views illustrating a finished structure of the hollow drive shaft according to the exemplary embodiment of the present invention.

As illustrated in S300 (FIG. 3), the cutting process S102 cuts a steel pipe to a predetermined length, thereby manufacturing a workpiece to be processed.

A workpiece 10 is a steel pipe made of steel, having a predetermined length and a circular cross section, and including a middle part 11 and both ends 12 and 13.

Next, when the workpiece is inputted to the upsetting processing facility, predetermined portions at both ends of the workpiece 10 are heated, and the workpiece is aligned at a predetermined position so that the upsetting process may be performed.

As illustrated in S302 (FIG. 3), the primary heating process S104 inserts predetermined portions at both ends of the aligned workpiece into a first heating unit by using an orthogonal transfer system or a robot system. The first heating unit may use various heating methods such as a high-frequency heating method, an electrical resistance method, or a gas combustion method. In particular, the high-frequency heating method is applied to raise a temperature to a desired temperature ranging from 1,100° C. to 1,300° C. within a short time.

The workpiece 10, which is primarily heated as described above, is transferred to a first upsetting unit 100, and the primary upsetting process is performed before a temperature of the workpiece is lowered to a predetermined temperature.

As illustrated in S304 (FIG. 3), the primary upsetting process S106 is a process of increasing outer diameters by pressing predetermined portions at both ends 12 and 13 of the workpiece.

The first upsetting unit 100 includes a first insertion hole 112 into which the workpiece 10 having a rod shape is inserted, a first forming die 110 having a first fixing unit (not illustrated) for fixing the workpiece, and a first mandrel 122 of a first punching die 120.

The first forming die 110 has the first insertion hole 114 formed in a cavity in a direction in which the workpiece 10 is inserted, and a first extension hole 114 in a direction in which the first mandrel 122 is inserted.

The workpiece 10 is inserted into the first insertion hole 112 of the first forming die 110, and one end of the workpiece 10 is fixed. The first mandrel 122 of the first punching die 120 is moved in a direction opposite to the movement direction of the workpiece 10 and inserted and pressed into the first extension hole 114.

The primary upsetting process is performed so that volumes at both ends 12 and 13 of the workpiece 10 are increased corresponding to a shape of the first extension hole 114 as the workpiece 10 is pressed by the first mandrel 122, such that the outer diameter is increased. As cross-sectional areas of the predetermined portions 12 and 13 at both ends of the workpiece 10, which has been subjected to the primary upsetting process, are increased, an overall length of the workpiece is decreased.

As illustrated in S306 (FIG. 3), the secondary heating process S108 inserts the predetermined portions 12 and 13 at both ends of the workpiece, which has been subjected to the primary upsetting process in the first upsetting unit 100, into a second heating unit by using an orthogonal transfer system or a robot system.

The second heating unit uses the high-frequency heating method in order to raise a temperature to a desired temperature ranging from 1,100° C. to 1,300° C. within a short time.

The workpiece 10, which is secondarily heated as described above, is transferred to a second upsetting unit 200, and the secondary upsetting process is performed before a temperature of the workpiece is lowered to a predetermined temperature.

As illustrated in S308 (FIG. 3), the secondary upsetting process S110 is a process of increasing the outer diameters by pressing the predetermined portions 12 and 13 at both ends of the workpiece.

The second upsetting unit 200 includes a second insertion hole 212 into which the workpiece 10 having a rod shape is inserted, a second forming die 210 having a second fixing unit (not illustrated) for fixing the workpiece 10, and a second mandrel 222 of a second punching die 220.

The second forming die 210 has the second insertion hole 212 formed in a cavity in a direction in which the workpiece 10 is inserted, and a second extension hole 214 in a direction in which the second mandrel 222 is inserted. In this case, the second extension hole 214 of the second forming die 210 is formed to have a greater diameter than the second extension hole 114 of the first forming die 110.

The workpiece 10 is inserted into the second insertion hole 212 of the second forming die 210, and one end of the workpiece 10 is fixed. The second mandrel 222 of the second punching die 220 is moved in a direction opposite to the movement direction of the workpiece 10 and inserted and pressed into the second extension hole 214.

The secondary upsetting process is performed so that volumes at both ends 12 and 13 of the workpiece 10 are increased corresponding to a shape of the second extension hole 214 as the workpiece 10 is pressed by the second mandrel 220, such that the outer diameter is increased.

Both ends 12 and 13 of the workpiece 10, which has been subjected to the secondary upsetting process, have greater thicknesses and outer diameters than both ends 12 and 13 of the workpiece 10 that has been subjected to the primary upsetting process. As cross-sectional areas at both ends 12 and 13 of the workpiece 10, which has been subjected to the secondary upsetting process, are increased, an overall length of the workpiece is decreased.

As illustrated in S310 (FIG. 3), because the temperature of the workpiece 10, which has been subjected to the secondary upsetting process, is too high, the air-cooling process S112 transfers the workpiece to a conveyor type cooling table and moves the workpiece to an unloading table, thereby naturally cooling the workpiece to a room temperature.

The post-treatment process S200 includes a computer numerical control (CNC) machining process S202, a rolling process S204, a high-frequency heat treatment process S206, a correction process S208, and a painting process S210.

The CNC machining process S202 performs turning machining on both ends 12 and 13 of the workpiece 10, which has been subjected to the upsetting process, to a predetermined dimension and shape by using a CNC lathe.

The rolling process S204 uses a form rolling machine to form splines at both ends 12 and 13 of the workpiece 10 that has been subjected to the CNC machining process.

The high-frequency heat treatment process S206 is a process of hardening a surface of the workpiece 10 to ensure durability and includes quenching and tempering.

The workpiece 10, which has been subjected to the rolling process, is heated to about 950° C. by a high-frequency heat treatment device and then cooled (quenching). The quenched workpiece has increased hardness but is unstable because residual stress remains on the surface of the workpiece. Therefore, the tempering is performed to change tissue of the workpiece to stable tissue and to reduce residual stress.

The tempering is performed by heating the quenched workpiece to 400 to 650° C. by using the high-frequency heat treatment device and then cooling the workpiece.

A dimension of the workpiece is changed after the high-frequency heat treatment process is performed. Therefore, the correction process S208 is performed by using an automatic press in order to ensure straight properties that represent straightness. The painting process S210 performs electro-painting that forms a paint film by applying electric current to water soluble paint in order to ensure an aesthetic appearance and corrosion resistance.

The hollow drive shaft 20 according to the present invention, which is manufactured as described above, is manufactured from a single workpiece and has a hollow portion formed therein. The upsetting process allows the hollow drive shaft 20 to have a structure in which an outer diameter at both ends 22 and 23 of the workpiece is greater than an outer diameter of a middle part 21 of the workpiece (see FIGS. 6 and 7).

In other words, each of both ends 22 and 23 of the hollow drive shaft 20 has a greater outer diameter and a larger thickness than the middle part 21, and has an equal inner diameter to the middle part 21. The outer diameter or the thickness of the middle part 21 is not change.

According to the present invention, the hollow drive shaft 20 is manufactured by using the upsetting process during the hot forging process.

According to the present invention, the hollow drive shaft may have the increased outer diameter at both ends thereof, which cannot be implemented by the swaging process, and thus a constant velocity joint and a ball cage, which are fastened to both ends of the drive shaft, may have increased diameters, such that it is possible to increase the number of balls and thus to transmit higher driving power.

The present invention provides the configuration in which the upsetting process is performed on one of both ends 22 and 23 of the hollow drive shaft 20 for convenience of description, as illustrated in FIGS. 4 and 5. However, actually, the upsetting process is simultaneously performed on both ends 22 and 23 of the hollow drive shaft 20.

Figure 8A:
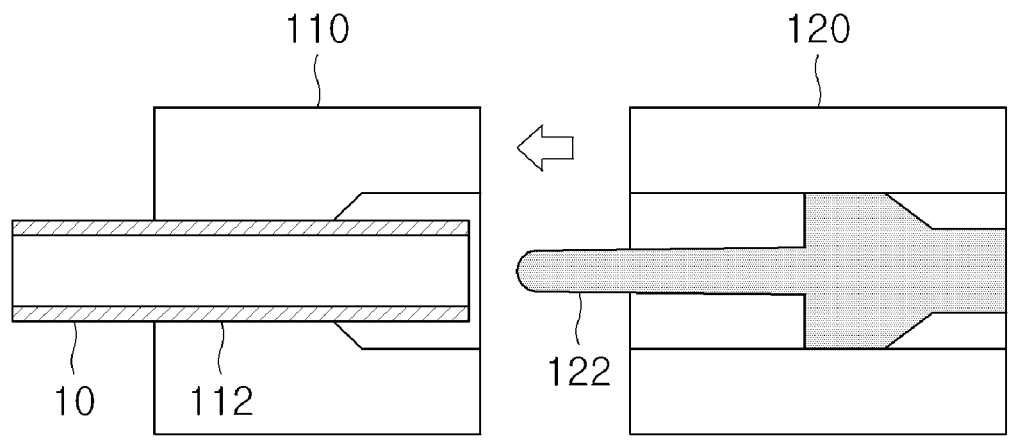
FIGS. 8A and 8B is a view illustrating an upsetting forming process according to another exemplary embodiment of the present invention.
Figure 8B:
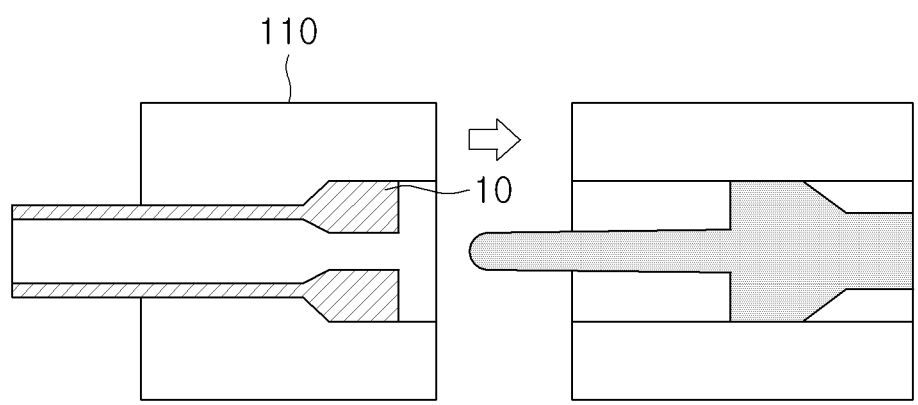
Figure 9:
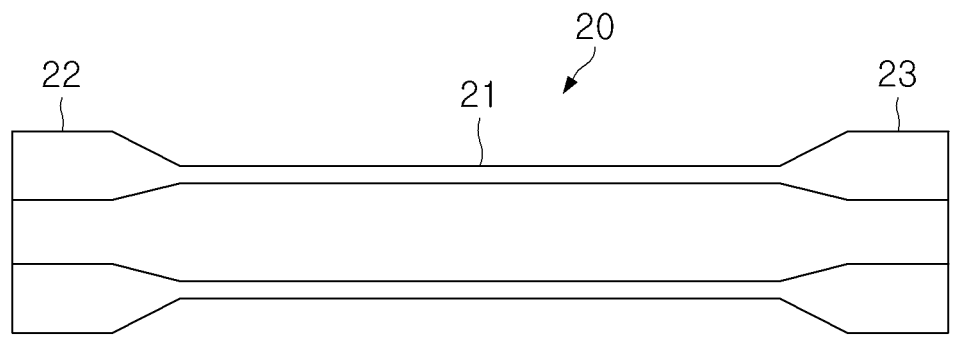
FIGS. 9, 10 and 11 are views illustrating a structure of the hollow drive shaft manufactured by the upsetting forming process according to the present invention.
Figure 10:
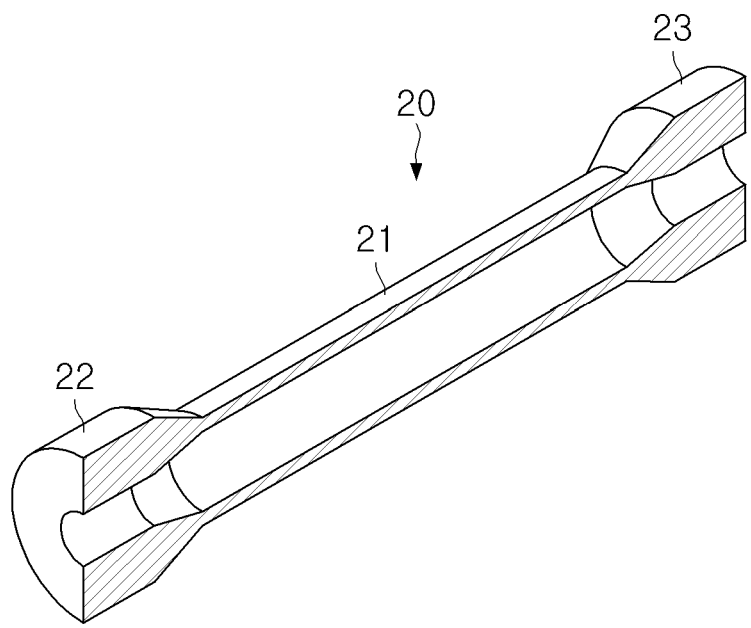
Figure 11:
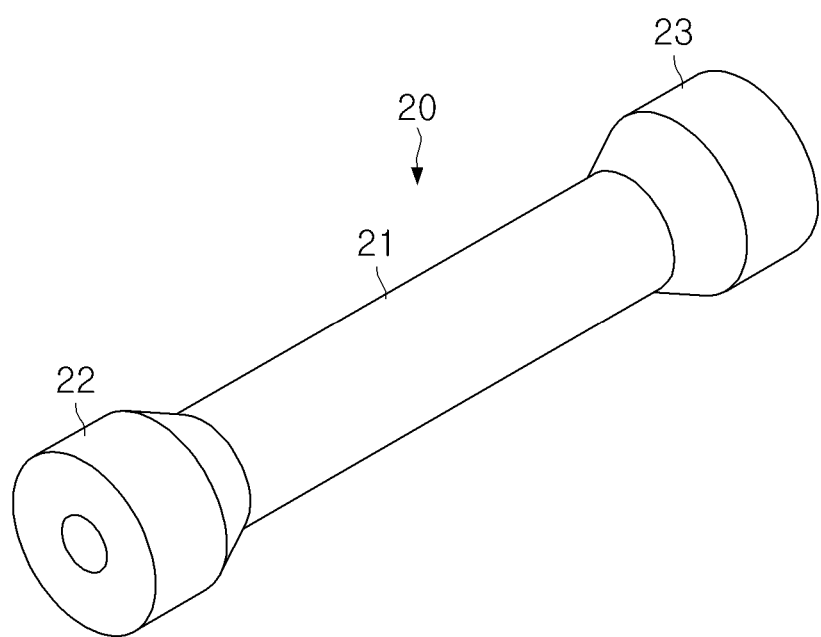
Figure 12A:
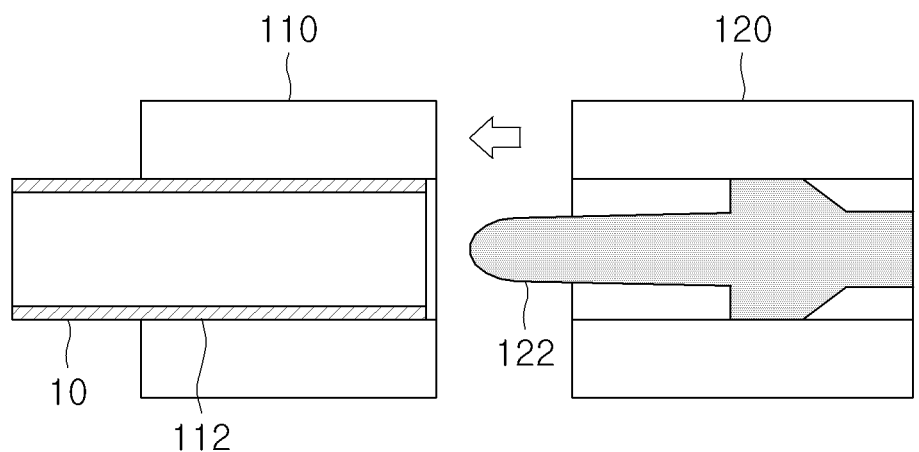
FIGS. 12A and 12B is a view illustrating an upsetting forming process according to still another exemplary embodiment of the present invention.
Figure 12B:
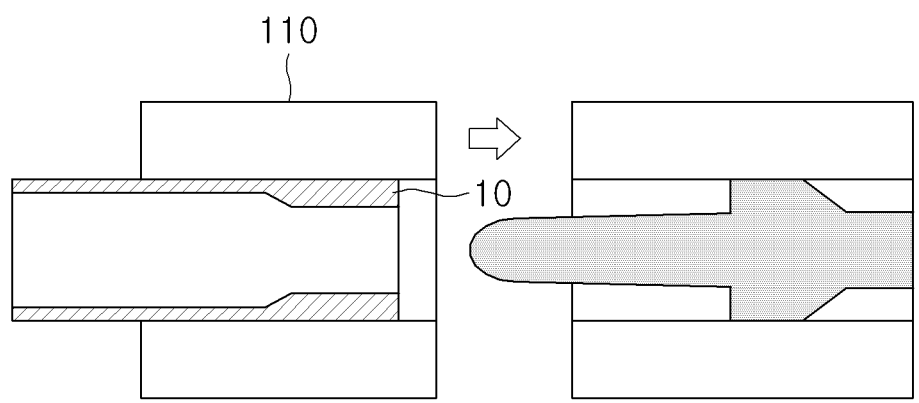
Figure 13:
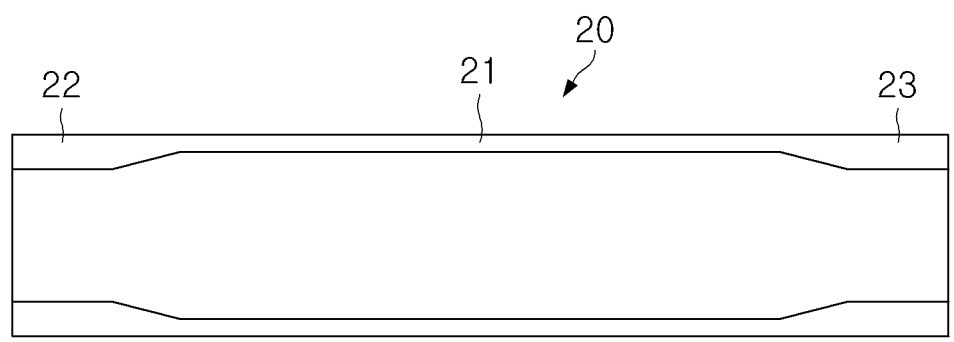
FIG. 13 is a view illustrating a structure of the hollow drive shaft manufactured by the upsetting forming process according to the present invention.

FIG. 8A to 8B is a view illustrating an upsetting forming process according to another exemplary embodiment of the present invention, FIGS. 9 to 11 are views illustrating a structure of the hollow drive shaft manufactured by the upsetting forming process according to the present invention, FIG. 12A to 12B is a view illustrating an upsetting forming process according to still another exemplary embodiment of the present invention, and FIG. 13 is a view illustrating a structure of the hollow drive shaft manufactured by the upsetting forming process according to the present invention.

As illustrated in FIG. 8A, the workpiece 10 is inserted into the first insertion hole 112 of the first forming die 110, and one end of the workpiece 10 is fixed. The mandrel 122 of the first punching die 120 moves in the direction opposite to the movement direction of the workpiece 10 and presses the workpiece in the horizontal direction. A diameter of the mandrel 122 is smaller than the inner diameter of the middle part.

The upsetting process is performed so that the volumes at both ends 12 and 13 of the workpiece 10 are increased corresponding to the shape of the first extension hole 114 as the workpiece is pressed by the mandrel 122, such that the outer diameter is increased.

As illustrated in FIG. 8B, the first forming die 110 forms a structure such that when the mandrel 122 is separated in the movement direction of the workpiece 10, an inner diameter at each of both ends 22 and 23 of the workpiece is smaller than an inner diameter of the middle part 11 of the workpiece 10.

As illustrated in FIGS. 9 to 11, the hollow drive shaft 20 is manufactured from a single workpiece and has a hollow portion formed therein. The upsetting process allows the hollow drive shaft 20 to have a structure in which the outer diameter is increased and the inner diameter is decreased at both ends 22 and 23 of the workpiece. In other words, each of both ends 22 and 23 of the hollow drive shaft 20 has a greater outer diameter and a larger thickness than the middle part 21, and has a smaller inner diameter than the middle part 21.

As illustrated in FIG. 12A, the workpiece 10 is inserted into the first insertion hole 112 of the first forming die 110, and one end of the workpiece 10 is fixed. The mandrel 122 of the first punching die 120 moves in the direction opposite to the movement direction of the workpiece 10 and presses the workpiece in the horizontal direction.

The inside of the workpiece 10 penetrate to both ends 12 and 13 of the workpiece 10 by being pressed by the mandrel 122.

As illustrated in FIG. 12B, the first forming die 110 forms a structure in which when the mandrel 122 is separated in the movement direction of the workpiece 10, an outer diameter of the middle part 11 of the workpiece 10 is equal to an outer diameter at each of both ends 22 and 23, and an inner diameter at each of both ends 22 and 23 of the workpiece is smaller than an inner diameter of the middle part 11.

As illustrated in FIG. 13, the hollow drive shaft 20 is manufactured from a single workpiece and has a hollow portion formed therein. The upsetting process allows the hollow drive shaft 20 to have a structure in which an inner diameter is decreased at both ends 22 and 23 of the workpiece.

In other words, each of both ends 22 and 23 of the hollow drive shaft 20 has a smaller inner diameter than the middle part 21, and has an equal outer diameter to the middle part 21.

The above-mentioned exemplary embodiments of the present invention are not implemented only by an apparatus and a method. Based on the above-mentioned descriptions of the exemplary embodiments, those skilled in the art to which the present invention pertains may easily realize the exemplary embodiments through programs for realizing functions corresponding to the configuration of the exemplary embodiment of the present invention or recording media on which the programs are recorded.

Although the exemplary embodiments of the present invention have been described in detail hereinabove, the right scope of the present invention is not limited thereto, and it should be clearly understood that many variations and modifications made by those skilled in the art using the basic concept of the present invention, which is defined in the following claims, will also belong to the right scope of the present invention.

The present invention is intended to improve performance of a drive shaft by applying an upsetting process during a hot forging process to manufacture the hollow drive shaft, and manufacturing the hollow drive shaft by using the upsetting process instead of a swaging process while limiting portions to be substantially processed to portions at both ends of a workpiece.

What is claimed is:
1. A method of manufacturing a hollow drive shaft using an upsetting method, the method comprising:
(A) inserting both ends of a workpiece cut to a predetermined length into a heating unit and heating both ends of the workpiece to a predetermined temperature;
(B) inserting both ends of the heated workpiece into a forming die and then pressing both ends of the heated workpiece with a mandrel in order to perform an upsetting process so that an outer diameter at both ends of the workpiece is greater than an outer diameter of a middle part of the workpiece;

(C) performing, after completing the performing of the upsetting process, a CNC machining process of performing turning machining on both ends of the workpiece, which has been subjected to the upsetting process, to a predetermined dimension and shape by using a computer numerical control (CNC) lathe;

(D) performing, by using a form rolling machine, a rolling process to form splines at both ends of the workpiece that has been subjected to the CNC machining process; and (E) performing a high-frequency heat treatment process of heating, by using a high-frequency heat treatment device, the workpiece, which has been subjected to the rolling process, to a predetermined temperature, cooling and quenching the workpiece, heating again, by using the high-frequency heat treatment device, the quenched workpiece to a predetermined temperature, and then cooling and tempering the workpiece.

2. The method of claim 1, wherein the steps (A) and (B) are repeated twice or more.

3. The method of claim 1, further comprising:

(F) performing, after performing the high-frequency heat treatment process, a correction process of correcting a changed dimension by using a press; and (G) performing a painting process of forming a paint film in order to ensure an aesthetic appearance and corrosion resistance.

4. The method of claim 1, wherein the step (B) comprises:
inserting both ends of the heated workpiece into a forming die having an insertion hole in a direction in which the workpiece is inserted, and an extension hole;
pressing the workpiece by moving the mandrel in a direction opposite to a movement direction of the workpiece and inserting the mandrel into the extension hole; and
performing the upsetting process so that volumes at both ends of the workpiece are increased corresponding to a shape of the extension hole as the workpiece is pressed by the mandrel, such that the outer diameter is increased, and
wherein each of both ends of the workpiece has a greater outer diameter and a larger thickness than the middle part of the workpiece, and has an equal inner diameter to the middle part of the workpiece.

5. The method of claim 1, wherein the step (B) comprises:
inserting both ends of the heated workpiece into a forming die having an insertion hole in a direction in which the workpiece is inserted, and an extension hole;
pressing the workpiece by moving the mandrel in a direction opposite to a movement direction of the workpiece and inserting the mandrel into the extension hole; and
performing the upsetting process so that volumes at both ends of the workpiece are increased corresponding to a shape of the extension hole as the workpiece is pressed by the mandrel, such that the outer diameter is increased,
wherein diameter of the mandrel is smaller than an inner diameter of the middle part, and
wherein each of both ends of the workpiece has a greater outer diameter than the middle part and has a smaller inner diameter than the middle part.

* * * * *